United States Patent
Clee et al.

(10) Patent No.: US 9,323,720 B2
(45) Date of Patent: Apr. 26, 2016

(54) AUTOMATED AND USER CUSTOMIZABLE CONTENT RETRIEVAL FROM A COLLECTION OF LINKED DOCUMENTS TO A SINGLE TARGET DOCUMENT

(75) Inventors: Scott J. Clee, Winchester (GB); Robert A. Harris, Christchurch (GB); Daniel E. Would, Eastleigh (GB); Shanna Xu, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1158 days.

(21) Appl. No.: 12/396,168

(22) Filed: Mar. 2, 2009

(65) Prior Publication Data

US 2010/0223541 A1    Sep. 2, 2010

(51) Int. Cl.
G06F 17/00    (2006.01)
G06F 17/21    (2006.01)
G06F 17/22    (2006.01)

(52) U.S. Cl.
CPC ............ *G06F 17/21* (2013.01); *G06F 17/2205* (2013.01)

(58) Field of Classification Search
CPC .................................................. H04M 1/7253
USPC .................. 715/208, 234, 205–206
See application file for complete search history.

(56) References Cited

U.S. PATENT DOCUMENTS

| | | | | |
|---|---|---|---|---|
| 5,778,181 | A * | 7/1998 | Hidary et al. | 725/110 |
| 6,011,537 | A * | 1/2000 | Slotznick | 715/733 |
| 6,070,176 | A * | 5/2000 | Downs et al. | 715/234 |
| 6,278,449 | B1 * | 8/2001 | Sugiarto et al. | 715/826 |
| 6,356,908 | B1 * | 3/2002 | Brown et al. | |
| 7,073,121 | B2 * | 7/2006 | Brown et al. | 715/205 |
| 7,096,423 | B2 | 8/2006 | Murata | |
| 7,162,493 | B2 * | 1/2007 | Weiss et al. | |
| 7,174,513 | B1 * | 2/2007 | Nickum | 715/738 |
| 7,379,932 | B2 * | 5/2008 | Agrawal et al. | 707/710 |
| 7,502,773 | B1 * | 3/2009 | Shakib et al. | |
| 7,711,743 | B2 * | 5/2010 | Cavagnaro et al. | 707/769 |
| 7,814,425 | B1 * | 10/2010 | O'Shaugnessy et al. | 715/752 |
| 8,799,262 | B2 * | 8/2014 | Paduroiu | 707/710 |

(Continued)

OTHER PUBLICATIONS

"Factsheet 5: How Do I convert web pages into Word or PDF documents?," [online] University of Aberdeen, WWW Information Pack, Web Team DIT, 2004 [retrieved Mar. 2, 2009] retrieved from the Internet: <http://www.abdn.ac.uk/webpack/factsheet5.shtml#section5.3>.

(Continued)

*Primary Examiner* — Manglesh M Patel
(74) *Attorney, Agent, or Firm* — Patents on Demand P.A.; Brian K. Buchheit; Scott M. Garrett

(57) ABSTRACT

A user initiated unification command can be received from a user interface. The unification command can be associated with a selected portion of a fragmented document. The fragmented document can include more than one discrete documents interconnected by at least one reference. Each reference can be a linkage to content of a document other than the one containing the reference. The selected portion can be associated with one of the discrete documents referred to as a root document. Responsive to the unification command, content represented by the reference can be acquired from the associated discrete documents without presenting the discrete document within a user interface window. The acquired content can be added to the root document.

20 Claims, 3 Drawing Sheets

(56) References Cited

U.S. PATENT DOCUMENTS

| | | | |
|---|---|---|---|
| 2002/0129114 A1* | 9/2002 | Sundaresan et al. | 709/213 |
| 2004/0019611 A1* | 1/2004 | Pearse et al. | 707/104.1 |
| 2004/0205633 A1* | 10/2004 | Martinez et al. | 715/526 |
| 2006/0271840 A1 | 11/2006 | Murata | |
| 2009/0119268 A1* | 5/2009 | Bandaru et al. | 707/3 |
| 2009/0204610 A1* | 8/2009 | Hellstrom et al. | 707/5 |

OTHER PUBLICATIONS

"GNU Wget 1.11.4 Manual: Recursive Download," [online] Free Software Foundation, Inc., 2000-2002 [retrieved Mar. 2, 2009] retrieved from the Internet: <http://www.gnu.org/software/wget/manual/wget.html#Recursive-Download>.

"My IBM Redbook," [online] IBM Alphaworks, Feb. 5, 2008 [retrieved Mar. 2, 2009] retrieved from the Internet: <http://services.alphaworks.ibm.com/MyR/>.

* cited by examiner

AUTOMATED AND USER CUSTOMIZABLE CONTENT RETRIEVAL FROM A COLLECTION OF LINKED DOCUMENTS TO A SINGLE TARGET DOCUMENT

BACKGROUND

The present invention relates to the field of digital content extraction (e.g., cut, copy, paste, etc.) from electronic documents and, more particularly, to automated and user customizable content retrieval from a collection of linked documents to a single target document (e.g., fragmented document).

There are an increasingly large number of environments and formats that digitally encoded information can be stored in. For instance, information can be in the form of a Web based document in a database accessible through a Web site. In particular, Web-based information is becoming increasingly fragmented as data is often retrieved from disparate locations. Even if located in a single data store, a set or collection of discrete electronic documents, referred to herein as a fragmented document, are often used to represent one unified concept. That is, what from a user perspective is a single document can actually be a set of two or more different electronic documents, which are linked (e.g., hyperlinks) to one another.

Content of a fragmented document is frequently dispersed and/or separated into paragraphs, sections, and titles, and the like, each of which may correspond to a different electronic document. For instance, it is not uncommon for portions of important information to be presented via a links (e.g., URLs) without displaying the actual information in an initial document. Thus, the user must access the content via the presented link by invoking a navigation action. This approach has advantages in a distributed computing and/or Web context, as only portions of fragmented documents are needed to be conveyed at a time, which decreases delivery and load time and is bandwidth conservative. One inherent negative, however, is that users frequently need to perform numerous navigation actions to acquire the fragmented document or a substantial portion thereof.

This repeated navigation can be particularly frustrating when a user wishes to copy, print, or otherwise output a user-desired portion of a fragmented document. For example, a user wanting to copy several non-contiguous sections of a fragmented document would have to navigate around the links of the fragmented document. During this navigation process, a user has to select desired sections, some of which may be longer than a single screen full of information. Then a user will cut desired content and paste it to a target document. This process can be repeated until desired content from the fragmented document is included in the target document, where it can be handled in a unified manner (e.g., saved, printed, etc.). The aforementioned process makes the task of copying portions (or all) of a fragmented document a time consuming and error prone endeavor.

One existing solution for obtaining all information from a Web-based fragmented document is to use some form of Web-crawler that follows links and downloads all sub-information. While some of these pre-fetching solutions can be crudely tailored to follow links of a certain type (e.g., images, video, etc.), ultimately content of the fragmented document is pre-fetched in a format it was in when presented within a browser. In other words, no convenient means for pulling specific sub-parts of a hierarchical structure of a fragmented document to a flat structure of a single electronic document exists.

DETAILED DESCRIPTION

Figure 1:
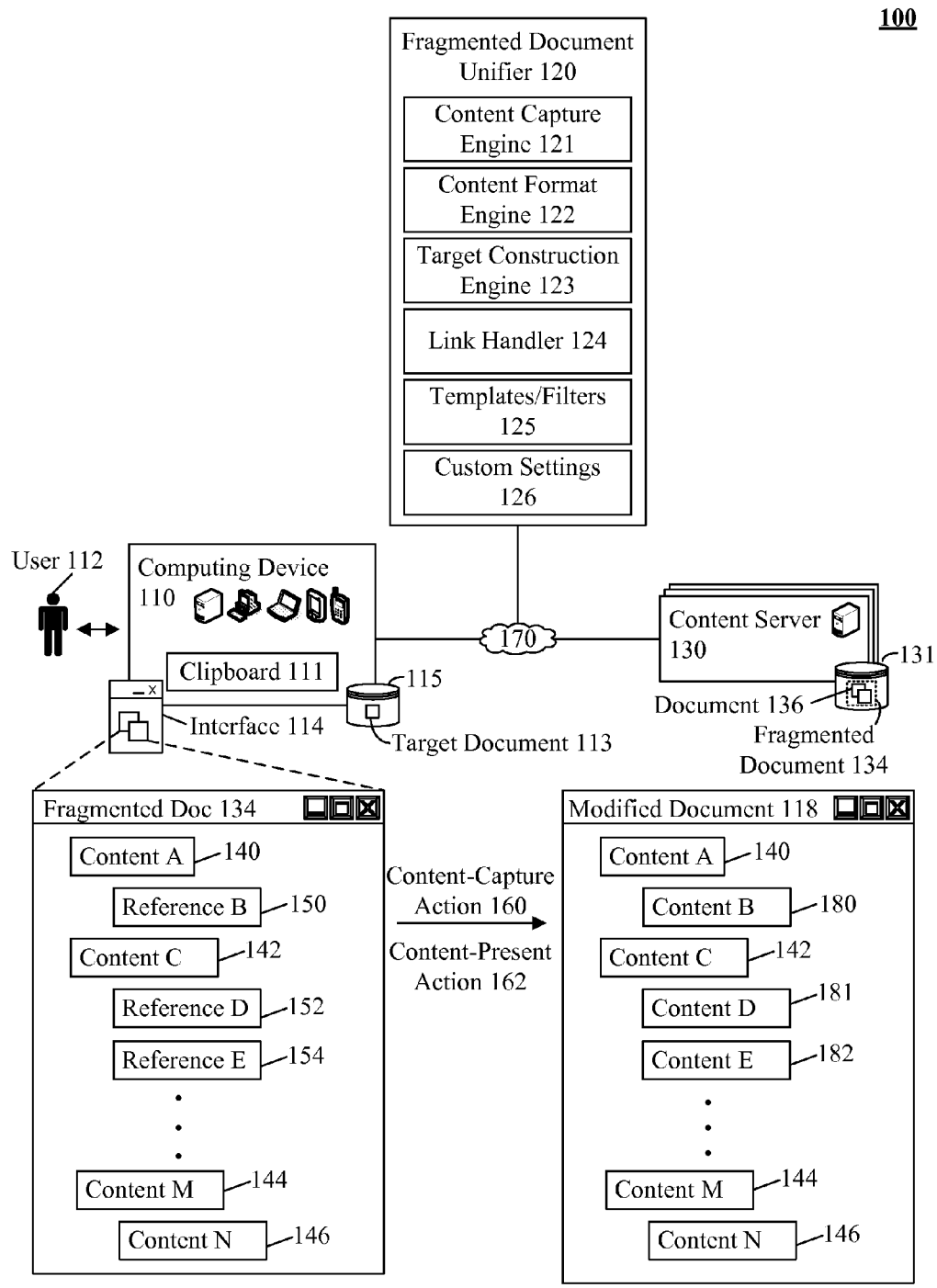
FIG. 1 is a schematic diagram illustrating a system for gathering content from a fragmented document and placing the gathered content into a target document in accordance with an embodiment of the inventive arrangements disclosed herein.

The disclosure facilitates content retrieval from a collection of documents to a single target document. The collection of documents can be referred to as a fragmented document. If a fragmented document was presented in printed book form, it would likely be a single document. When presented electronically, the fragmented document can be implemented as multiple discrete documents, linked to one another. This is common in a Web paradigm for multiple reasons (i.e., only a portion of a fragmented document needs be conveyed over a network, needs to be processed, and needs to be rendered at a time, which increases responsiveness to user requests and conserves computing resources). For example, a fragmented Web book can include hyperlinks to each chapter and/or chapter section, each chapter/section being a distinct electronic document.

This disclosure removes a need to repetitively navigate to different sections of a fragmented document and perform cut-and-paste operations that ultimately result in a single electronic document organized in "book form." That is, the disclosure enables a user to create a target document (e.g., in a single continuous flat layout) from content extracted from multiple pages of a fragmented document without navigating into links, tags, and titles. In one embodiment, the disclosed innovation can be implemented as a specialized copy-and-paste operation. In one embodiment, a user can customize content retrieval behavior, such as by determining whether inclusive links are to be ignored, whether content from a linked document is to replace an inclusive link, whether linked content is to be included as an appendix of a target document, and the like.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for gathering content from a fragmented document 134 and placing the gathered content into a target document 113 in accordance with an embodiment of the inventive arrangements disclosed herein. In system 100, a user 112 of computing device 110 can be presented with a fragmented document 134 via a user interface 114. The fragmented document 134 can include semantic content 140, 142, 144, 146 and references 150, 152, 154 to related content.

For example, Reference B (item 150) can relate to Content B (item 180); Reference D (item 152) can relate to Content D (item 181); Reference E (item 154) can relate to Content E (item 182); and the like. Different portions of the fragmented document 134, such as Referenced Content B, D, and/or E), can be originally stored in different discrete documents 136 from each other and from a "root" document 136, which contains one or more references 150, 152, 154.

A user 112 is able to initiate a content-capture action 160. The content capture action 160 can cause at least a portion of the fragmented document 134 to be placed in a storage medium, such as clipboard 111 memory. A content-present action 162 can cause content placed in the storage medium by a content-capture action 160 to be presented in an interface as a modified document 118 and/or to be placed in target document 113. The storage medium can be a volatile or non-volatile memory. Depending on implementation specifics, a "save" action against modified document 118 may or may not be required to create target document 113 from modified document 118. In one embodiment, the action 160 can be a cut, copy, or other command, such as a specialized variant of a cut or copy command. The action 162 can be a paste command. In one implementation, functionality of actions 160 and 162 can be integrated in a single programmatic action, such as a copy-paste action. Actions 160 and/or 162 can apply to an entire fragmented document 134 or a portion thereof, where the portion is optionally able to be user selected.

Execution of actions 160-162 can cause content 180, 181, 182 previously associated with a reference 150, 152, 154 to be automatically obtained without forcing a user 112 to navigate to the references 150, 152, 154. By default, for example, referenced content 150, 152, 154 can be replaced by equivalent content 180-182 responsive to actions 160-162. The behavior of the actions 160-162 can be tailored for different implementation scenarios and/or can be user customizable.

As just mentioned, one customization can cause a reference 150-154 to be replaced by content 180-182 to which the reference 150-154 relates. Another customization, can cause selective ones of the references 150-154 to be ignored. For example, references 150-154 beyond a user configurable depth (e.g., three or more levels deep) can be ignored. Still another user selectable customization, can cause referenced content 180-184 to be added to an appendix of the target document 113. In one embodiment, the appendix can be stored in a companion document distinct from the target document 113. These configurable customizations are exemplary and are not to be construed as exhaustive.

The actions 160-162 can apply to numerous types of documents and/or interfaces. For example, in one embodiment, the interface 114 can be a browser interface, the fragmented document 134 can be a Web document, and the one or more of the references 150-154 can include hyperlinks to other content. The fragmented document 134 can be stored in one or more data stores 131 remotely located from computing device 110 and served (e.g., by one or more content server 130) over a network 170. Different ones of the discrete documents 136 can be URL accessible documents.

In another embodiment, interface 114 can be a user interface of a locally executing (to device 110) software application, which does not require network 170 connectivity. In such a situation, fragmented document 134 can be stored on a storage medium, such as data store 115.

The fragmented and target documents 134, 113 can include numerous types of content including, but not limited to, text, graphics, sound, video, animation, and the like. Further, each document 113, 134 can be stored in numerous formats, such as RTF, HTML, PDF, XML, MPEG4, MP3, a word processing format, a spreadsheet format, and the like. In one embodiment, a format of and/or formatting characteristics of the modified document 118 and/or target document 113 can differ from that of the fragmented document 134. For example, content inserted into a word processing document can be reformatted to have target document 113 specific formatting characteristics that differ from those of the document 134 from which the content 140-146 and 180-182 was extracted.

Computer program code that executes to perform actions 160-162 can be run from device 110, server 130, and/or from any device communicatively linked to network 170. In one embodiment, the computer program code can be implemented as a service, such as a Web service. The computer program code is shown as fragmented document unifier 120, which is stored in a storage medium accessible by hardware capable of executing the computer program code. The fragmented document unifier 120 can include a content capture engine 121, a content format engine 122, a target construction engine 123, a link handler 124, templates/filters 125, a set of customizable settings 126, and/or other such components. Behavior of each of the engines 121-123 and handler 124 can be adjusted based upon the templates/filters 125 and/or settings 126. The settings 126 can be user-specific, application specific, document type specific, document specific, device 110 specific, server 130 specific, and the like. Additionally, the settings 126 may be user 112 customizable or not depending upon implementation choices of system 110.

The content capture engine 121 can acquire content 140-146 and referenced content (references 150-154) from document 134. In one embodiment, a user can select a portion of document 134, and all content related to that portion can be acquired by engine 121, while other content of document 134 will be ignored during a content capture action 160. For example, all content included in a demarcated region and/or highlighted region of interface 114 can be captured by engine 121, as well as all content linked to this captured content via references 150-154.

The engine 121 can automatically retrieve content associated with a reference 150 in a user 112 transparent fashion, without requiring a user 112 to perform navigation actions to the referenced content. In during so, the engine 121 can acquire content from multiple discrete documents 136, even when this content is served from different servers 130. In one embodiment, actions of engine 122 can be performed in the background using available computing resources so as not to appreciably slow down a user 112 perceived responsiveness of device 110.

In one embodiment, document 136 metadata can be used by engine 121 to identify references 150-154 for which content can be retrieved. References 150-154 can include hierarchical information, including but not limited to, Uniform Resource Identifiers (URIs), hypertext markup language (HTML) tags, Extensible Markup Language (XML) tags, formatting characters, and the like. User specified structural information can be supplied to enable automated content retrieval to be performed.

Content format engine 122 can optionally transform a format of content captured by engine 121. For example, engine 122 can apply a different CSS stylesheet to captured content. Engine 122 can also alter layout characteristics of textual documents, can convert content from one format to another (e.g., convert all images to .JPG, convert all document formats to a rich text format, etc.), and perform other conversions and/or transformations. The engine 122 is an optional component, which can execute during a later phase of the content capture action 160 and/or during an early phase of the content present action 162.

Content construction engine 123 can retrieve captured and optionally reformatted content from a fragmented document 134 and can place this content in a modified document 118 and/or a target document 113. Engine 123 can append the retrieved content to an existing document at a user designated point and/or can create a new document 113,118 that includes only the retrieved content.

The link handler 124 can identify references in a fragmented document 134. In one embodiment, the link handler 124 can infer and/or create references given a unique identifier, from which a reference can be determined. That is, a reference 150-154 need not be explicit, but can be inferred and then determined by the link handler 124. For example, a title of a book and/or an ISBN number can be included in a discrete document 136, which lacks an explicit hyperlink to the book. Handler 124 can recognize the unique identifier and perform a Web search for the referenced content, which results in a link to the content. This link can thereafter handled as if it were an explicit link. Settings 126 can determine whether links are to be inferred and/or discovered by engine 121 in implementations where this option is available. Prompting of user 112 can optionally occur during the content capture action 160 process when desired actions are unclear. Further, inferred content acquired by handler 124 can be handled differently from content associated with explicit links. For example, inferred content can be added to a target document 113 as an appendix, while explicit content can be embedded within the target document 113 in place of the associated reference 150-154.

The templates/filters 125 can be used to modify the behavior of the unifier 120. For example, templates/filters 125 can cause certain types of media to be handled in a media specific manner. For example, different templates can be established for digital image references than for text references, which may, for example, cause retrieved digital images to be placed in an appendix of the target document 113 and cause retrieved text to be embedded and substituted in place of a reference. Other templates and/or rules can be established to handle references differently depending upon a type of fragmented document 134 being handled, a size of a content associated with a reference, a quantity of references contained in the fragmented document 134, and the like. Filters can limit application of the unifier 120 in various ways. For example, a filter can establish a linkage "depth" for acquiring content from linked sites.

Custom settings 126 can be settings that are to be applied to a specific user 112 or set of users 112, which are user modifiable. In one embodiment, for example, users 112 can create/edit templates/filters 125. In another embodiment, complex templates/filter 125 modifications can be restricted from users 112, but settings 126 can be adjusted which adjust a limited set of characteristics of one or more templates/filters 125. Custom settings 126 can affect whether links are able to be inferred by the link handler 124, whether acquired formatting of content is to be adjusted (by engine 122), a look-and-feel of a user interface that utilizes unifier 120 functionality, and the like.

Figure 2:
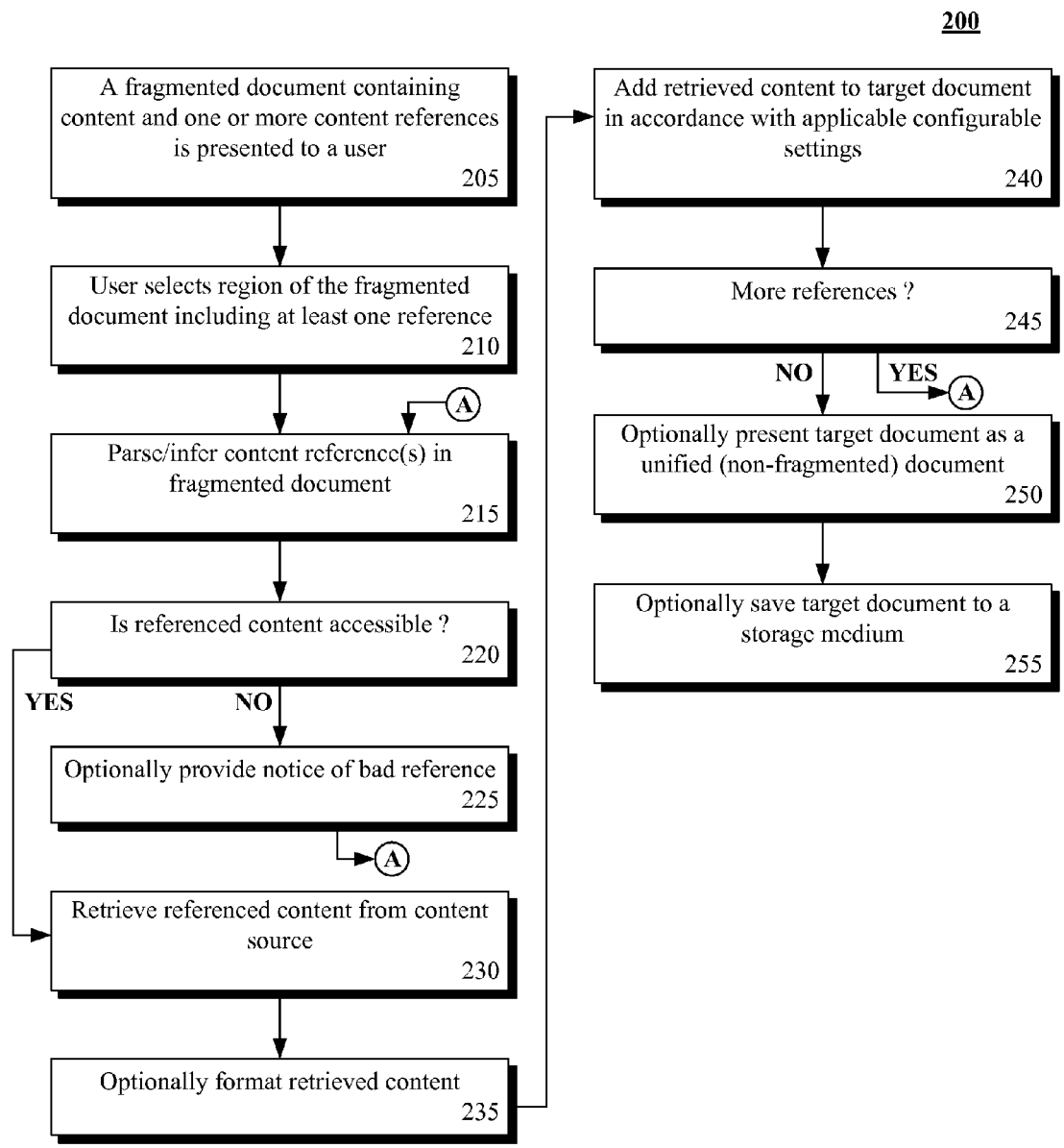
FIG. 2 is a schematic diagram illustrating a method for retrieving content referenced in a fragmented document in accordance with an embodiment of the inventive arrangements disclosed herein.

FIG. 2 is a schematic diagram illustrating a method 200 for retrieving content referenced in a fragmented document in accordance with an embodiment of the inventive arrangements disclosed herein.

Method 200 can begin in step 205, where a fragmented document containing content and one or more content references can be presented to a user. In step 210, a user can select a region of the fragmented document, such includes at least one reference. In step 215, a first reference included in the selected region can be parsed/inferred. A check can be made in step 220 to determine if the referenced content is accessible. If not, a notice and/or warning can be optionally presented to the user, as shown by step 225. For example, if a user lacks network connectivity, a notice such as "Reference XXX refers to a remote URL that is not currently accessible due to a lack of network connectively." It should be appreciated that some references in a fragmented document can be to different local documents, which do not require network connectivity.

If referenced content is accessible, this content can be retrieved from the content source and placed in a local memory, such as a clipboard memory, as shown by step 230. In step 235, retrieved content can be optionally reformatted. In step 240, retrieved content can be added to a target document in accordance with applicable settings, which may be configurable. For example, content can be substituted in place of a reference, can be added to an appendix of the target document, etc. In one embodiment, when content is placed in an appendix, a reference can be optionally redirected to that appendix (as opposed to pointing to a remote data source or linking to a separate document).

If more references exist in the selected portion of the fragmented document, the method can proceed from step 245 back to step 215, where a next reference can be handled. Otherwise, step 250 can optionally execute, which results in the target document being presented to a user. The target document can be a unified or non-fragmented document. In step 255, the target document can be optionally saved to a storage medium. The saving can occur automatically as part of content acquisition process or can occur responsive to an explicit user command through an interface.

Figure 3:
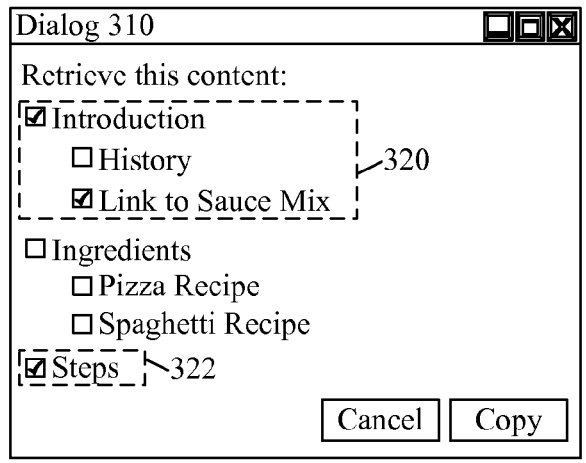
FIG. 3 is a schematic diagram illustrating a set of interfaces interacting with fragmented documents in accordance with an embodiment of the inventive arrangements disclosed herein.
Figure 3:
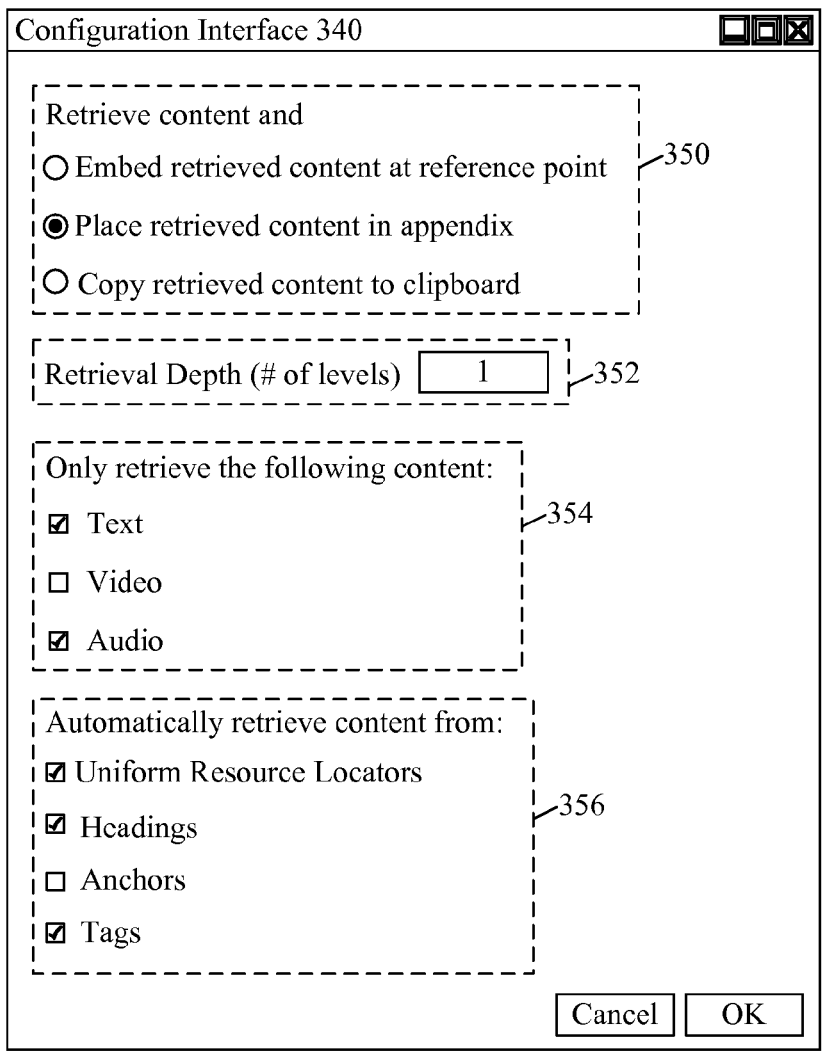

FIG. 3 is a schematic diagram illustrating a set of interfaces 310, 340 interacting with fragmented documents in accordance with an embodiment of the inventive arrangements disclosed herein. Interface 310 can be presented automatically in response to document presentation or can be manually presented in response to a user action (e.g., copy command). Interfaces 310, 340 can be presented within a Web browser, word processing application, and the like. In one embodiment, interfaces 310, 340 can be operating system interfaces enabling global behavior management for content retrieval.

Dialog 310 can be presented to a user enabling rapid selection and retrieval of content from one or more documents. Dialog 310 can include structural information including, but not limited to, headings, Uniform Resource Locators (URLs), images, and the like. In one instance, dialog 310 can enable selection of content to be automatically retrieved. For example, a user can select content 320, 322 to be compiled into a new document when the content is retrieved.

In interface 340, options 350-356 can allow for the customization of content retrieval. In option 350, retrieved content can be configured to be handled in a variety of ways. Option 350 can permit retrieved content to be embedded at a reference point, placed within an appendix, or placed within a clipboard buffer. Option 350 can permit other user configured options including, copying content to an application specific buffer, writing content to user specified formats, and the like. Although presented as exclusive options, in one configuration, option 350 can permit multiple options to be selected simultaneously.

Option 354 can permit a user to control retrieved content by content type. For instance, when content is requested, video content can be optionally neglected. Based on selected content type, user settings can be established for handling the specified content. Finite handling of content retrieval can be configured through user configured filters (not shown).

In option 356, content references can be selected to enable content retrieval to remain flexible between content types. For example, option 356 can be configured to identify URLs and retrieve content from Web-based documents. Option 356 can permit user configured references such as Really Simple Syndication feeds, slideshow formatted content, content tags, and the like.

Drawings presented herein are for illustrative purposes only and should not be construed to limit the invention in any regard. Options associated with dialog 310 and interface 340 can be presented within the context of a pull-down menu, context menu, and the like. Interface elements of dialog 310, 340 can include, but are not limited to, checkboxes, radio selection elements, text entry fields, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for unifying a fragmented document comprising:
   identifying structural information elements of a root document, wherein the structural information elements comprise at least one reference to a discrete document other than the root document;
   presenting to a user, the identified structural information elements within a rapid selection interface for selective acquisition of content from the discrete document;
   receiving at the rapid selection interface, a user initiated unification command including a user selection of one or more of the presented structural information elements;
   responsive to said unification command, acquiring content represented by the at least one reference from the discrete document without presenting the discrete document within a user interface window; and
   adding the acquired content to the root document.

2. The method of claim 1, when adding the acquired content, replacing the reference with the acquired content at a location in the root document where the reference was previously positioned.

3. The method of claim 1, wherein adding the acquired content, places the acquired content in an appendix section of the root document.

4. The method of claim 1, wherein the at least one reference comprises a plurality of references comprising a first reference and a second reference, further comprising:
   responsive to said unification command, acquiring content represented by the first reference from at least one of the discrete documents other than the root document without presenting the discrete document within a user interface window;
   responsive to said unification command, acquiring content represented by the second reference from at least one of the discrete documents other than the root document without presenting the discrete document within a user interface window;
   adding the acquired content associated with the first reference to the root document by replacing the first reference with the acquired content at a location in the root document where the first reference was previously positioned; and
   adding the acquired content associated with the second reference by placing the acquired content in an appendix section of the root document.

5. The method of claim 1, wherein said plurality of documents are stored in different storage mediums located in different geographic locations, wherein the different storage mediums are communicatively linked via a network.

6. The method of claim 1, wherein each of the discrete documents is associated with a unique uniform resource locator (URL).

7. The method of claim 1, wherein said user interface is a Web browser and wherein said reference is a hyperlink.

8. The method of claim 1, wherein said reference is referred to as a first-level reference, wherein the discrete document associated with the reference comprises at least one second-level reference to another one of the plurality of discrete documents, said acquiring of content comprising:
   acquiring second-level content represented by the second-level reference from the associated discrete document;
   replacing the second-level reference with the acquired second-level content at a location where the second-level reference was previously positioned; and
   replacing the first-level reference with the acquired content at a location in the root document where the first-level reference was previously positioned.

9. The method of claim 8, further comprising:
   configuring a depth value associated with the unification command;
   determining a depth of a reference from the root document before acquiring content associated with a reference;
   when the determined depth is less or equal to than the depth value, acquiring content associated with the reference; and
   when the determined depth is greater than the depth value, taking no action to acquire content associated with the reference.

10. The method of claim 1, further comprising:
    determining a unique identifier within the root document; and
    creating a reference that corresponds to the unique identifier, wherein the reference directly refers to one of the discrete documents other than the root document, wherein the unique identifier does not directly refer to the discrete document.

11. The method of claim 1, further comprising:
    formatting the acquired content in accordance with the root document before adding the acquired content to the root document.

12. The method of claim 1, further comprising:
    executing a client-side program, that receives the unification command, acquires the content, and adds the acquired content to the root document.

13. The method of claim 1, further comprising:
    executing a Web service, that receives the unification command, acquires the content, and adds the acquired content to the root document.

14. A computer program product for unifying a fragmented document comprising a non-transitory computer readable storage medium having computer usable program code embodied therewith, the computer program product comprising:
    computer usable program code configured to identify structural information elements of a root document, wherein the structural information elements comprise at least one reference to a discrete document other than the root document;
    computer usable program code configured to present to a user, the identified structural information elements within a rapid selection interface for selective acquisition of content from the discrete document;
    computer usable program code configured to receive at the rapid selection interface, a user initiated unification command including a user selection of one or more of the presented structural information elements;
    computer usable program code configured to, responsive to said unification command, acquire content represented by the at least one reference from the discrete document without presenting the discrete document within a user interface window; and
    computer usable program code configured to add the acquired content to the root document.

15. A system for unifying a fragmented document comprising a computing device comprising hardware comprising one or more processors and a non-transitory storage medium, wherein the non-transitory storage medium store programmatic code that the one or more processors execute, wherein said computing device is configured to execute programmatic code, execution of which causes said computing device to:
    identify structural information elements of a root document, wherein the structural information elements comprise at least one reference to a discrete document other than the root document;
    present to a user, the identified structural information elements within a rapid selection interface for selective acquisition of content from the discrete document;
    receive at the rapid selection interface, a user initiated unification command including a user selection of one or more of the presented structural information elements;
    responsive to said unification command, acquire content represented by the at least one reference from the discrete document without presenting the discrete document within a user interface window; and
    add the acquired content to the root document.

16. The method of claim 1, wherein identifying structural information elements of the root document is performed manually responsive to a user input, or automatically responsive to presentation of the root document.

17. The method of claim 1, wherein the structural information elements of the root document further comprise one or more of headings, and images.

18. The computer program product of claim 14, further comprising:
   computer readable code configured to identify structural information elements of the root document responsive to a user input, or automatically responsive to presentation of the root document.

19. The computer program product of claim 14, wherein the structural information elements of the root document further comprise one or more of headings, and images.

20. The system of claim 15, wherein said computing device is further configured to execute programmatic code, execution of which causes said computing device to identify structural information elements of the root document responsive to a user input, or automatically responsive to presentation of the root document, wherein the structural information elements of the root document further comprise one or more of headings, and images.

\* \* \* \* \*